(12) United States Patent
Haimer

(10) Patent No.: US 11,420,270 B2
(45) Date of Patent: Aug. 23, 2022

(54) CLAMPING DEVICE FOR CLAMPING AN ARTICLE, BALANCING ADAPTER FOR A BALANCING DEVICE, BALANCING DEVICE AND CLAMPING DEVICE SET

(71) Applicant: FRANZ HAIMER MASCHINENBAU KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 16/895,094

(22) Filed: Jun. 8, 2020

(65) Prior Publication Data
US 2020/0384546 A1 Dec. 10, 2020

(30) Foreign Application Priority Data
Jun. 7, 2019 (DE) .................... 102019115599.1

(51) Int. Cl.
*B23B 31/177* (2006.01)
*B23B 31/40* (2006.01)
*B23B 31/20* (2006.01)

(52) U.S. Cl.
CPC ...... *B23B 31/16237* (2013.01); *B23B 31/202* (2013.01); *B23B 31/207* (2013.01);
(Continued)

(58) Field of Classification Search
CPC ........ B23B 31/16237; B23B 31/16258; B23B 2231/04; B23B 31/202; B23B 31/207;
(Continued)

(56) References Cited

U.S. PATENT DOCUMENTS

| 968,051 | A | * | 8/1910 | Hanson | ................. B23B 31/202 |
| | | | | | 279/51 |
| 1,428,100 | A | * | 9/1922 | Kahl | .................... B23B 31/207 |
| | | | | | 279/51 |

(Continued)

FOREIGN PATENT DOCUMENTS

| AU | 555289 B2 | 9/1986 |
| DE | 8703050 U1 | 4/1987 |

(Continued)

*Primary Examiner* — Eric A. Gates
(74) *Attorney, Agent, or Firm* — Laurence A. Greenberg; Werner H. Stemer; Ralph E. Locher

(57) ABSTRACT

A clamping device for clamping an article or workpiece to be balanced includes a clamping apparatus for clamping the article. The clamping apparatus has an adjusting device for adjusting the clamping diameter of a clamping body of the clamping apparatus for clamping the article on a placement surface. The clamping body has a disk-shaped spring element sprung in radial direction with a centrally disposed clearance forming at least one spring element cone. The clamping body also has a clamping element inserted into the clearance and having at least one corresponding clamping element cone. The adjusting device has an actuating device for displacing the clamping element relative to the spring element, for moving the cone surfaces of the clamping element cone and the spring element cone relative to one another and for consequently clamping and/or unclamping the spring element in radial direction by the cone surfaces.

24 Claims, 8 Drawing Sheets

(52) U.S. Cl.
CPC .... *B23B 31/4013* (2013.01); *B23B 31/16258* (2013.01); *B23B 31/4026* (2013.01); *B23B 2231/04* (2013.01); *B23B 2270/205* (2013.01); *Y10T 279/1973* (2015.01); *Y10T 279/22* (2015.01)

(58) Field of Classification Search
CPC ............. B23B 31/4013; B23B 31/4026; Y10T 279/1973; Y10T 279/22
See application file for complete search history.

(56) References Cited

U.S. PATENT DOCUMENTS

| | | | | |
|---|---|---|---|---|
| 2,493,300 A * | 1/1950 | Le Tourneau | ........ | B23B 31/207 279/58 |
| 2,630,328 A * | 3/1953 | Bradway | ............... | B23B 31/207 279/50 |
| 2,820,640 A * | 1/1958 | Regan | .................. | B23B 31/207 279/43.6 |
| 2,985,454 A * | 5/1961 | Stoner | .................. | B23B 31/202 279/2.03 |
| 3,022,082 A * | 2/1962 | Haviland | .................. | F16B 5/06 279/46.7 |
| 3,160,420 A * | 12/1964 | Simpson | ............... | B23B 31/202 279/110 |
| 3,515,400 A * | 6/1970 | Jendry | ............. | B23B 31/16237 279/121 |
| 3,658,353 A * | 4/1972 | Parsons | ............. | B23B 31/16237 279/121 |
| 3,834,720 A * | 9/1974 | Parsons | ............. | B23B 31/16237 279/133 |
| 4,541,465 A * | 9/1985 | Leadbeatter | ........ | B23B 31/4013 142/55 |
| 4,570,949 A * | 2/1986 | Morawski | ........... | B23B 31/1253 279/110 |
| 4,838,561 A * | 6/1989 | Baranzelli | ......... | B23B 31/16241 279/127 |
| 5,149,111 A * | 9/1992 | Han | ...................... | B23B 31/202 279/156 |
| 5,613,692 A * | 3/1997 | Lloyd | .................... | B23B 31/202 279/2.03 |
| 6,149,364 A * | 11/2000 | Maeda | ................... | B23B 31/202 411/432 |
| 8,651,498 B2 * | 2/2014 | Timtner | ................... | B23B 31/20 279/4.07 |
| 8,733,764 B1 * | 5/2014 | Stafford | ............ | B23B 31/16275 279/127 |
| 9,586,267 B2 | 3/2017 | Haimer | | |

FOREIGN PATENT DOCUMENTS

| | | | |
|---|---|---|---|
| DE | 202012100886 U1 | 4/2012 | |
| DE | 102015215757 A1 | 4/2017 | |
| GB | 540663 A * | 10/1941 | .......... B23B 31/202 |
| WO | 2013029645 A1 | 3/2013 | |

\* cited by examiner

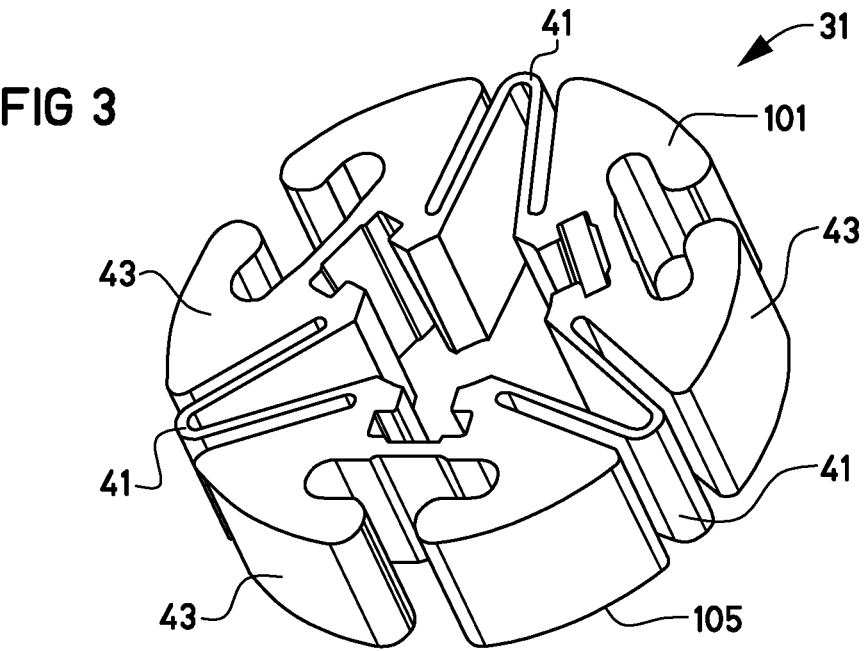
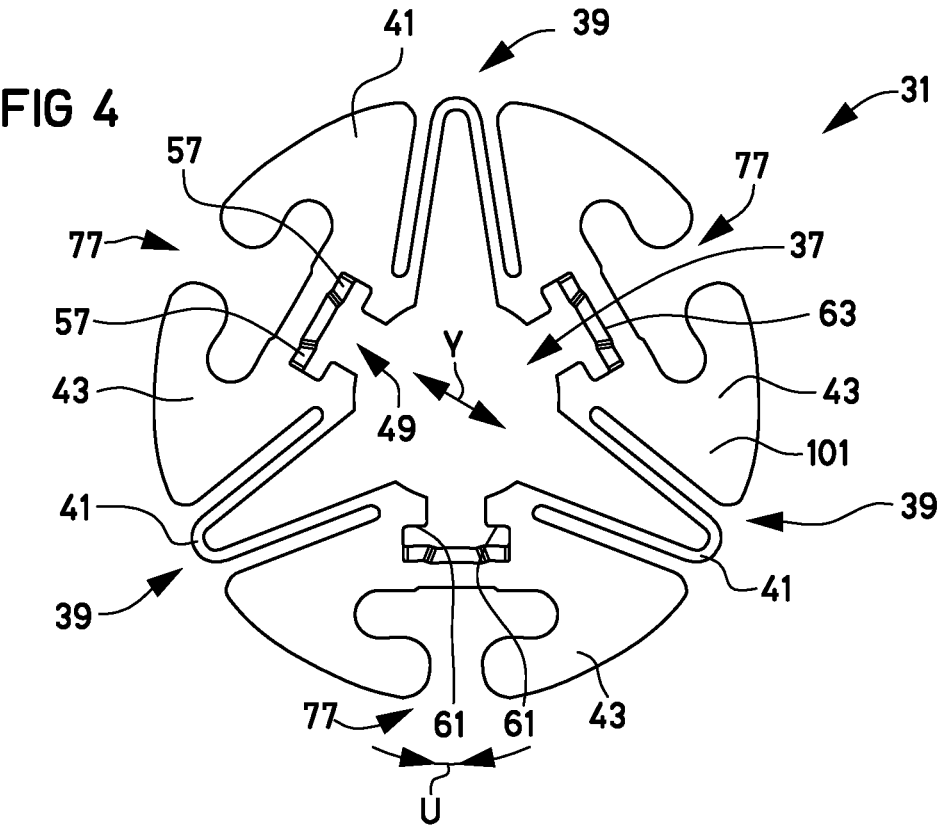

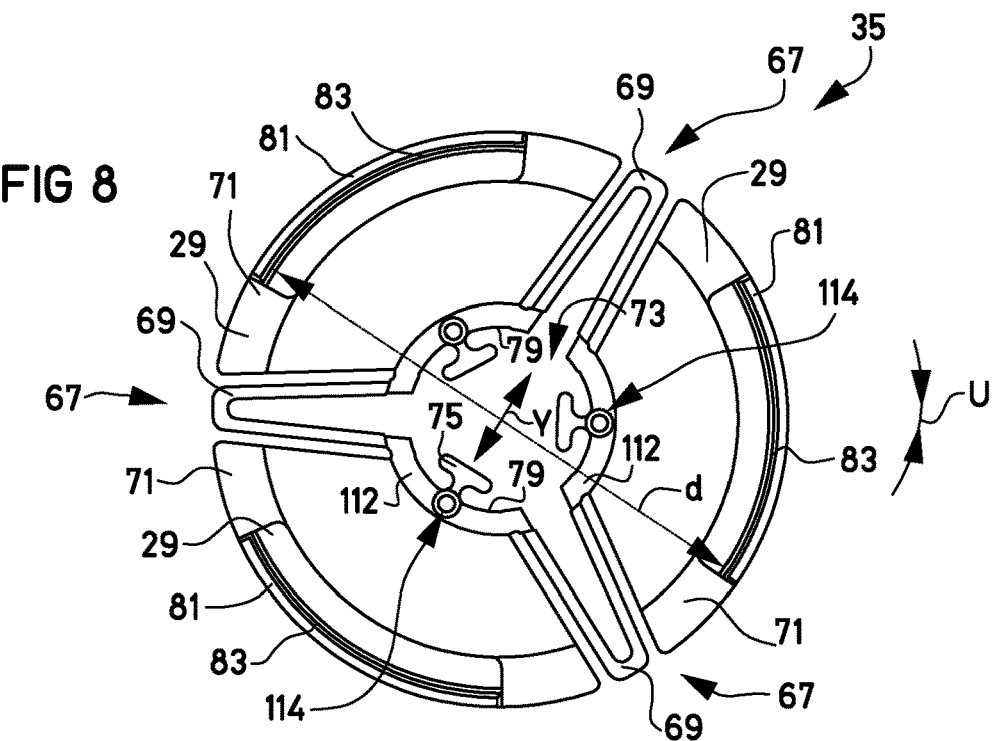
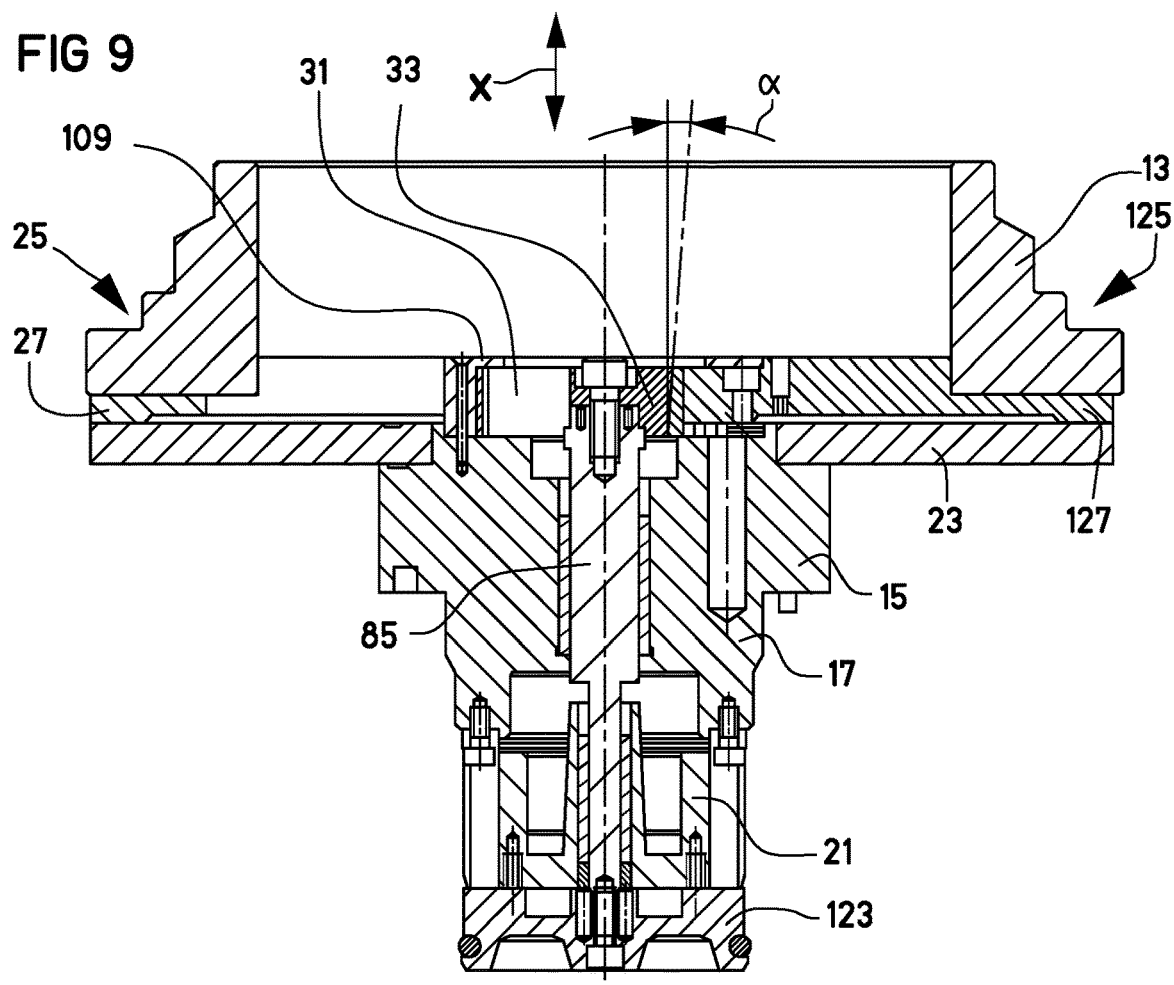

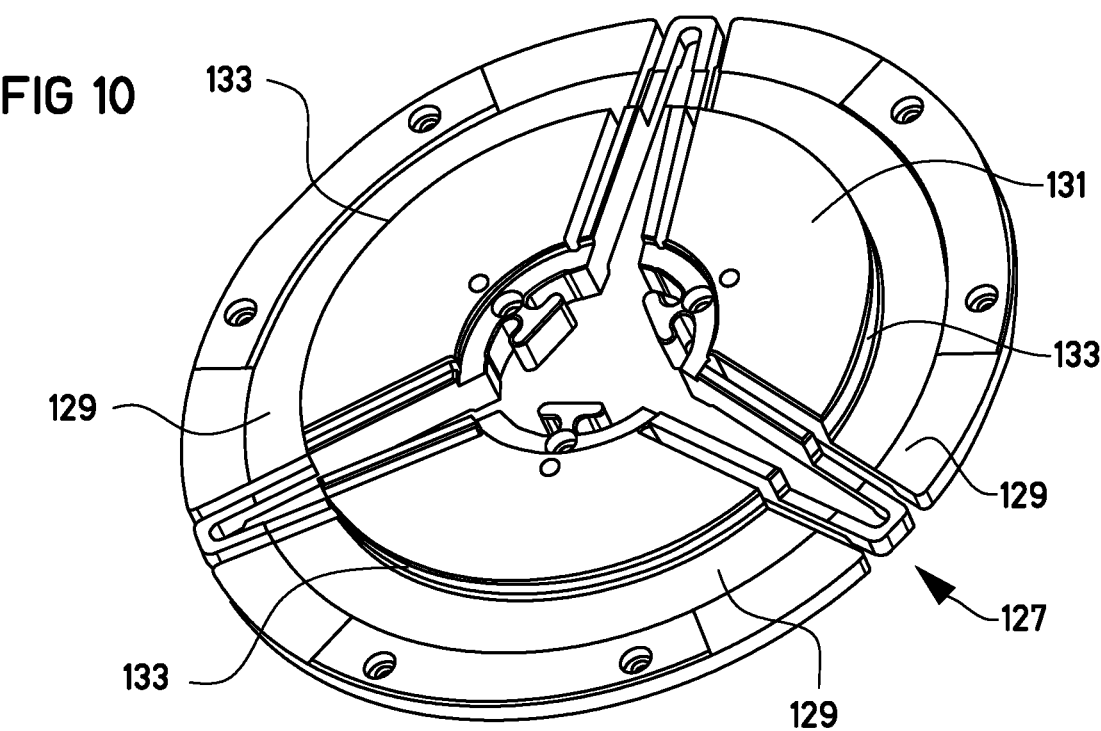
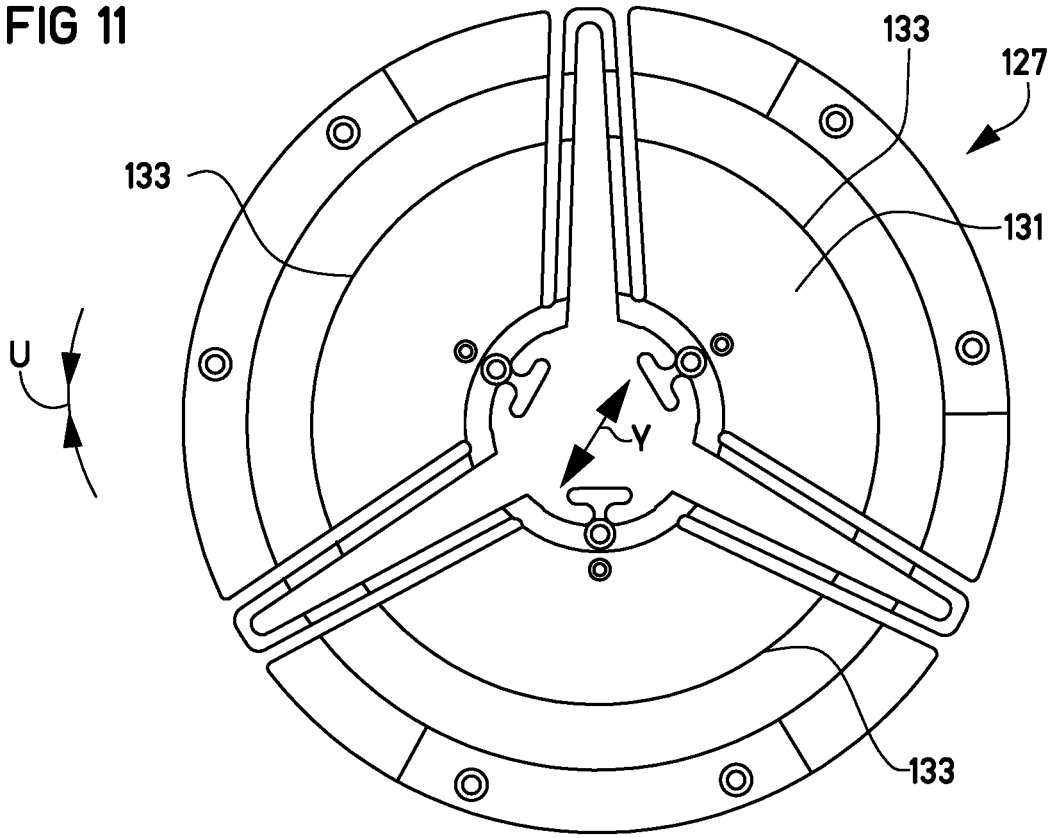

FIG 17
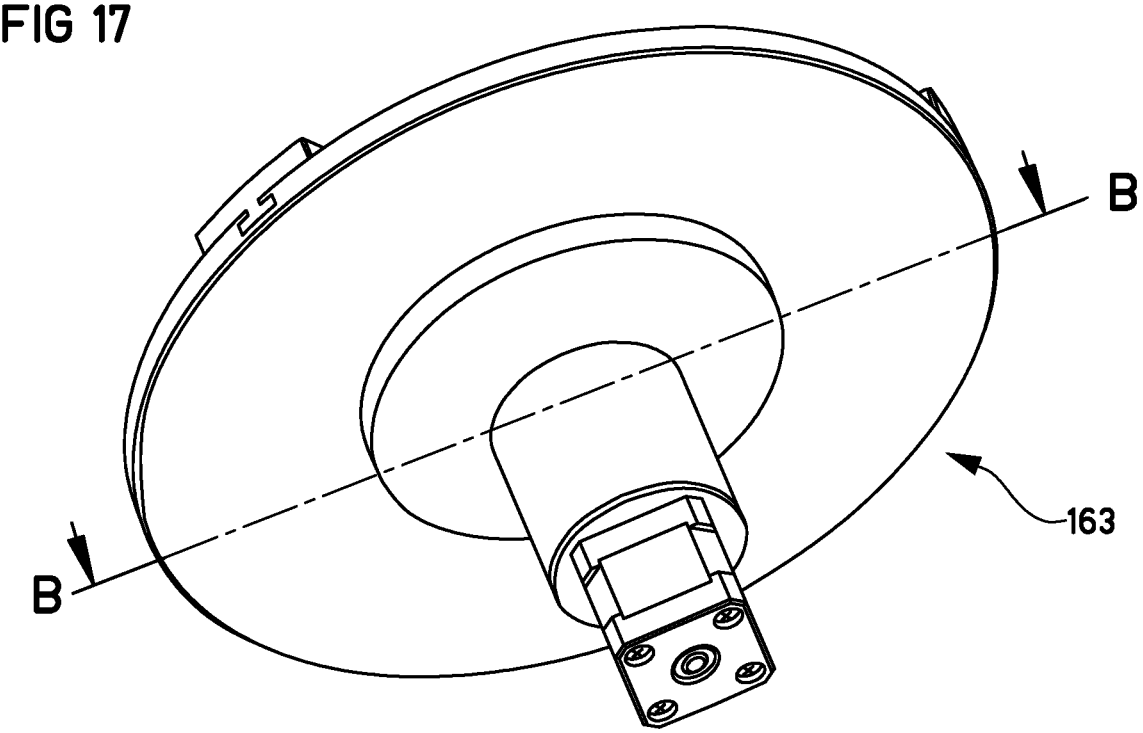
FIG 18    B-B
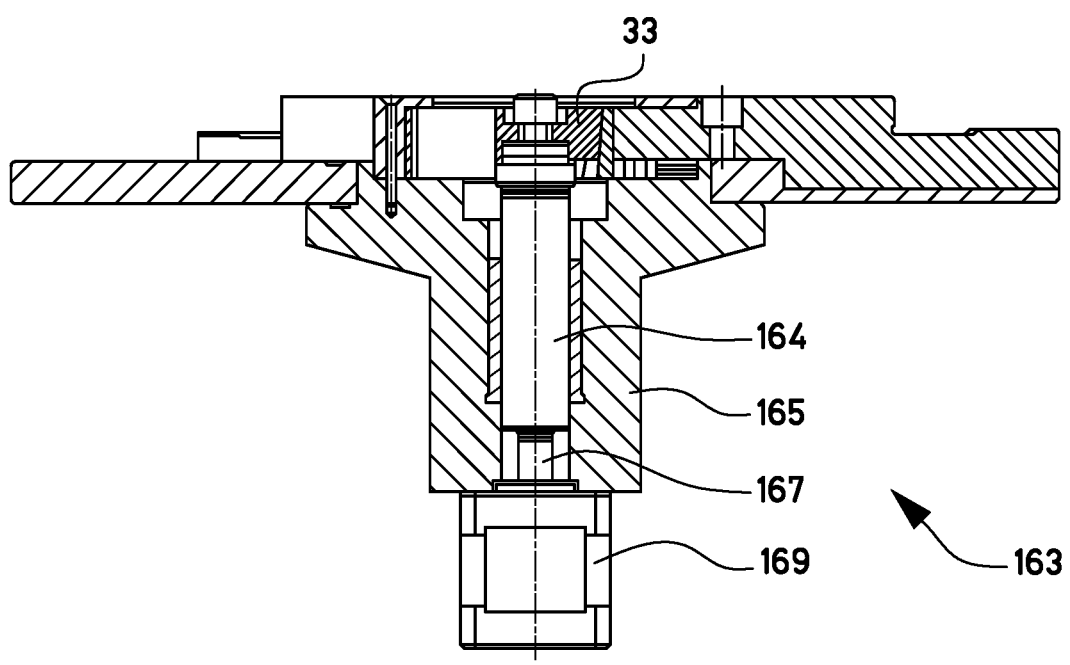

CLAMPING DEVICE FOR CLAMPING AN ARTICLE, BALANCING ADAPTER FOR A BALANCING DEVICE, BALANCING DEVICE AND CLAMPING DEVICE SET

CROSS-REFERENCE TO RELATED APPLICATION

This application claims the priority, under 35 U.S.C. § 119, of German Patent Application DE 10 2019 115 599, filed Jun. 7, 2019; the prior application is herewith incorporated by reference in its entirety.

BACKGROUND OF THE INVENTION

Field of the Invention

The invention relates to a clamping device for clamping an article, in particular a workpiece to be balanced, including a clamping apparatus for clamping the article, the clamping apparatus having an adjusting device with which a clamping diameter of a clamping body of the clamping apparatus can be adjusted, for clamping an article, in particular placed on at least one placement surface, by adjusting the clamping diameter. The invention also relates to a balancing adapter for a balancing device having the clamping device, a balancing device having the balancing adapter and a clamping device set, in particular for producing a clamping device.

There are known balancing devices in which the balancing device has a fixed or stationary base station, which can be equipped with exchangeable balancing adapters. The balancing adapters can in that case usually be fixed on a drive spindle of the base station, which has a balancing adapter holder and is a component part of a drive device of the base station for the rotary drive of a balancing adapter. Workpieces to be balanced, such as for example milling tools, tool holders or belt pulleys, can be held or clamped through the use of the balancing adapters fixed on the base station. In the clamped state, the workpieces can then be balanced by the balancing device.

The exchangeable balancing adapters primarily differ from one another in that they have different clamping systems and clamping dimensions or clamping diameters for the clamping of workpieces. Therefore, a specific type of workpieces can be clamped by each balancing adapter. For example, milling tools and tool holders are usually clamped by a balancing adapter which makes it possible for a workpiece to be clamped from the outside. On the other hand, certain belt pulleys or grinding disks with a centrally disposed, cylindrical clearance are clamped by a balancing adapter which makes it possible for a workpiece to be clamped from the inside. Consequently, particularly easy adaptation of the balancing device to different workpieces to be clamped is made possible by the exchangeable balancing adapters, whereby the balancing device is particularly flexible.

Furthermore, it is also known to equip a balancing adapter with a clamping apparatus, which has an adjusting device, through the use of which the clamping diameter or the outside diameter of a clamping disk of the clamping apparatus can be adjusted in such a way that, by adjusting the clamping diameter, the clamping disk can be pressed against a workpiece placed on a placement surface, and consequently the workpiece can be clamped.

International Publication WO 2013/029645 A1, corresponding to U.S. Pat. No. 9,586,267, discloses for example a balancing adapter for a balancing device in which a clamping disk sprung in the radial direction is provided, the clamping diameter of which can be adjusted by an adjusting device in order to clamp a workpiece placed on a placement surface. In that case, the clamping disk is connected at a central region, seen in the radial direction, to a sleeve, the radially inner wall of which forms an inner cone. Passed through this sleeve is a rod-shaped actuating element, which has an outer cone corresponding to the inner cone. According to a first exemplary embodiment of the balancing adapter, the cone surfaces or the cones are in that case aligned in such a way that, by displacing the actuating element in relation to the sleeve in the clamping direction, the clamping disk is pressed open radially outwardly. In that way, workpieces can be clamped from the inside. In the case of a second exemplary embodiment of the balancing adapter, on the other hand, the cone surfaces are aligned in such a way that, by displacing the actuating element in relation to the sleeve in the clamping direction, the clamping disk is drawn together radially inwardly by its own elasticity. As a result, workpieces can be clamped from the outside.

Consequently, in that case at least two balancing adapters are required, in order to be able through the use of the balancing device to balance both workpieces to be clamped from the outside and workpieces to be clamped from the inside. In particular, exchanging the balancing adapters is in that case relatively laborious. Moreover, the assembly of such a balancing adapter is also laborious due to the structure of the cone components.

BRIEF SUMMARY OF THE INVENTION

It is accordingly an object of the invention to provide a clamping device for clamping an article, a balancing adapter for a balancing device, a balancing device and a clamping device set, which overcome the hereinafore-mentioned disadvantages of the heretofore-known devices of this general type and which can be easily assembled, have great flexibility and make effective clamping of articles possible.

With the foregoing and other objects in view there is provided, in accordance with the invention, a clamping device for clamping an article, in particular a workpiece to be balanced, including a clamping apparatus for clamping the article, wherein the clamping apparatus has an adjusting device, with which the clamping diameter of a clamping body of the clamping apparatus, formed in particular as a clamping disk, can be adjusted, and wherein by adjusting the clamping diameter, an article, in particular placed on a placement surface, can be clamped. According to the invention, the clamping body has a disk-shaped spring element, which is formed in particular as a circular disk, is sprung in the radial direction and has a clearance, which is centrally disposed, as seen in the radial direction, and by which at least one spring element cone is formed. Moreover, the clamping body has a clamping element, which is inserted into the clearance of the spring element and has at least one clamping element cone corresponding to the spring element cone. Furthermore, the adjusting device has an actuating device, through the use of which the clamping element is displaceable in relation to the spring element, in particular in the axial direction of the clamping disk, in such a way that the cone surfaces of the clamping element cone and of the spring element cone move in relation to one another, and consequently the spring element is clamped and/or unclamped in the radial direction through the use of the clamping element under the effect of the cone surfaces or the cones, in particular by changing the clamping diameter of the clamping body and/or the outside diameter of the spring element.

In this way, the clamping device can be assembled particularly easily, since the components of the clamping apparatus that have a cone are now a component part of the clamping body. As a result, the cone components can be preassembled independently of the further components of the clamping device and be connected in the preassembled state to a base body of the clamping device. This makes the assembly of the clamping device much easier. Moreover, as a result, the structural possibilities for the further components of the clamping device, in particular also for the actuating device of the clamping device, are also enhanced. What is more, articles can also be clamped particularly effectively by the clamping device according to the invention, since the clamping forces are exerted in this case by the cone surfaces of the disk-shaped spring element directly outwardly in the radial direction or in a clamping plane. Thus, an undesired "bending up" of the clamping body is effectively counteracted and improved clamping of articles becomes possible.

The term "clamping diameter" should be understood in this case expressly in a broad sense. Thus, the clamping contour of the clamping body can be adapted almost at will to the contour of the article to be clamped. The contour therefore does not necessarily have to be in the form of a circle or in the form of a segment of a circle, but may for example also be in the form of an ellipse or in the form of a polygon. It is preferred, however, if the clamping contour of the clamping body is in the form of a circle. Similarly, it is also the case in this regard that an article does not necessarily have to be clamped with surface engagement. Thus, an article can for example also be clamped on the clamping body with line or point engagement. In this case, the article may also only be clamped at a few points, for example by pins that are mounted on the clamping body.

In a preferred construction of the clamping device according to the invention, the clamping element and the spring element form an assembly unit or a structural unit, in particular in the form of a disk. As a result, the assembly of the clamping device is made much easier.

It is preferably provided in this case that this assembly unit can be disposed in multiple rotary positions on the clamping device, wherein the assembly unit can be disposed in a first rotary position, in which a first main surface wall of the spring element is in engagement with a defined engagement wall region, wherein the assembly unit can be disposed in a second rotary position, in which a second main surface wall of the spring element is in engagement with the defined engagement wall region. In this way, the components of the clamping body that have a cone can be disposed on the clamping device both in a first rotary position and in a second rotary position, turned by 180°.

Preferably, the actuating device has an actuating element, in particular in the form of a rod and/or in the form of a cylinder, which can be displaced between a starting position and an end position and can be coupled to the clamping element of the clamping body in such a way that, when there is a displacement between the starting position and the end position, the actuating element also displaces the clamping element, and consequently the clamping element is displaced in relation to the spring element. Through the use of such an actuating element, the clamping element can be easily displaced in relation to the spring element. Through the use of a rod-shaped or cylindrical actuating element, an effective weight saving can in this case be realized, in particular in comparison with a conical actuating element. For a functionally reliable construction, it is also preferred if the rod-shaped actuating element is linearly displaceable in a cylindrical clearance of at least one housing body, in particular with at least one ball guide interposed.

It is particularly preferably provided that, for the case where the assembly unit is disposed in the second rotary position, the spring element is pressed open radially outwardly by displacement of the actuating element coupled to the clamping element from the end position into the starting position, or downwardly in the clamping direction, by the clamping element under the effect of the cone surfaces or the cones, whereas, for the case where the assembly unit is disposed in the first rotary position, the spring element is drawn together radially inwardly by displacement of the actuating element coupled to the clamping element from the end position into the starting position by the clamping element under the effect of the cone surfaces or the cones. In this way, articles can be clamped from the inside by the spring element and the clamping element when the structural unit is disposed in the first rotary position. Moreover, articles can also be clamped from the outside by the spring element and the clamping element when the structural unit is disposed in the second rotary position. Thus, the clamping device can be adapted easily and effectively to different articles to be clamped, whereby the clamping device is particularly flexible. In particular, it is in this case also no longer required to exchange the entire clamping device.

Preferably, the rod-shaped actuating element and the clamping element may be connectable to one another in a manner preventing inappropriate turning and/or in a releasable manner. It is in this case preferably provided that an end region of the rod-shaped actuating element has an unround and/or polygonal cross section, with which the actuating element can be disposed in a contour-adapted manner in at least one corresponding clearance of the clamping element. Through the use of such a connection of the clamping element and the actuating element in a manner preventing inappropriate turning, it is reliably ensured that articles can be clamped in a defined way with great repetition accuracy.

It is in this case preferably provided that the clamping element has two identical clearances corresponding to the end region, which are disposed on opposite sides, as seen in the axial direction, of the clamping element. Thus, the clamping element can be easily connected to the actuating element in a manner preventing inappropriate turning both in the first rotary position and in the second rotary position of the structural unit. Preferably, the two clearances of the clamping element are also at a distance from one another in the axial direction.

In a preferred construction, the at least one cone of the clamping element and/or the at least one cone of the spring element has a cone angle which lies in a range of from 1° to 20°, in particular in a range of from 1° to 10°. Through the use of such a cone angle, the spring element can be functionally reliably clamped and unclamped in the radial direction. The cone angle in this case represents the angle between a cone surface of the respective cone and the central longitudinal axis or axis of rotation of the clamping disk.

Preferably, the clamping element and the spring element are connected to one another, in particular in a releasable manner, by a gripping-behind connection and/or by a surface-engaging connection, in order to realize a functionally optimized connection of the clamping element and the spring element. Preferably, in the non-assembled state of the assembly unit, the spring element is in this case pre-loaded in the radial direction by the clamping element inserted into the central clearance.

In a preferred specific construction, the clamping element has a central, in particular cylindrical or conical, region and multiple, in particular three, guiding rails protruding outwardly, in particular radially, from the central region, wherein each guiding rail lies in a contour-adapted manner in a corresponding rail holder of the spring element, with the formation of a gripping-behind engagement. Thus, the clamping element can be easily connected to the spring element displaceably in relation to the spring element. It is in this case preferably provided that each guiding rail is formed as cross-sectionally T-shaped, in order to realize a particularly effective construction. Expediently, the guiding rails may be disposed uniformly distributed around the central region, as seen in the circumferential direction. It goes without saying that guiding rails and rail holders could also be disposed the other way around, so that therefore guiding rails are attached to the spring element, protrude radially inwardly and can engage in corresponding rail holders on the outer side of the clamping element.

It is preferably provided that each cross-sectionally T-shaped guiding rail is connected by its T base to the central region of the clamping element, and that the wall regions of the T top of the guiding rails that are facing away from the central region of the clamping element form an outer cone of the clamping element and are or can be brought into surface engagement with wall regions of the spring element that form an inner cone. Moreover, it is then provided that the wall regions of the T top of the guiding rails that are facing toward the central region of the clamping element form an inner cone of the clamping element and are or can be brought into surface engagement with wall regions of the spring element that form an outer cone. Through the use of such cones on the clamping element and the spring element, the spring element can be effectively pressed open radially outwardly and drawn together radially inwardly by the clamping element.

Expediently, the T top of the guiding rails may be formed in the form of a cuboid and/or in the form of a block, in order to realize an effective construction. Preferably, the cone surfaces of the guiding rails that form the outer cone and the inner cone are formed as planar surfaces, in order to make production of the clamping element easier. Alternatively, however, it may also be provided that the cone surfaces of the guiding rails are arcuately curved.

In a preferred specific construction, the disk-shaped spring element has multiple spring portions disposed uniformly distributed in the circumferential direction, by which the spring element can be sprung in the radial direction, wherein, as seen in the circumferential direction, disk portions of the spring element that are disposed between the spring portions are connected to one another by way of the spring regions. Thus, the spring element can be easily formed as sprung in the radial direction.

For effective springing, the spring regions may be formed by thin-walled webs of the spring element, which, as seen in a plan view of the spring element, have a substantially wave-form and/or meander-form and/or arcuate and/or V-shaped profile.

Particularly preferably, the clamping body has a disk-shaped adapter element sprung in the radial direction, and is consequently formed as a clamping disk, wherein the adapter element has a clearance, which is centrally disposed, as seen in particular in the radial direction, in which the spring element of the clamping disk is inserted, and wherein the adapter element has at least one clamping surface for the clamping of a workpiece to be balanced. Through the use of such an adapter element, the clamping disk can be easily adapted to an article to be clamped or to a clamping contour of an article to be clamped.

Preferably, the adapter element and the spring element are releasably connected to one another by a gripping-behind connection and/or by a surface-engaging connection.

In a specific construction, the adapter element may have multiple, in particular three, webs protruding into the clearance, wherein each protruding web lies in a contour-adapted manner in a corresponding web holder of the spring element, while forming a gripping-behind engagement. Thus, the adapter element can be easily connected to the spring element. It is preferably provided in this case that each web is formed as cross-sectionally T-shaped. Also, preferably, the webs are disposed uniformly distributed, as seen in the circumferential direction of the clamping disk. It goes without saying that the clearance and the webs may also be disposed the other way around, so that therefore webs are attached to the spring element, protrude radially outwardly and can engage in a corresponding clearance on the inner side of the adapter element.

In a specific construction, the disk-shaped adapter element may have multiple spring portions disposed uniformly distributed in the circumferential direction, through the use of which the adapter element can be sprung in the radial direction, wherein, as seen in the circumferential direction, disk portions of the adapter element that are disposed between the spring portions are connected to one another by way of the spring portions. It is preferably provided in this case that the spring regions are formed by thin-walled webs of the adapter element, which, as seen in a plan view of the adapter element, have a substantially wave-form and/or meander-form and/or arcuate and/or V-shaped profile.

Preferably, the adapter element has the placement surface of the balancing adapter for the placement of a workpiece to be balanced. The adapter element may then also have a clamping base, in particular a cylindrical clamping base, which protrudes from the placement surface in the axial direction of the clamping disk, in particular radially, is disposed inside the placement surface and the wall regions of which that are facing toward the placement surface form clamping surfaces for the clamping of an article. Through the use of such an adapter element, articles can be easily clamped from the inside. In principle, the placement surface may however also be formed by a region of the clamping device disposed outside the clamping disk.

Alternatively, the adapter element may also have multiple clamping webs, in particular thin-walled clamping webs, which protrude from the placement surface in the axial direction of the clamping disk, in particular radially, are disposed outside the placement surface and the wall regions of which that are facing toward the placement surface form clamping surfaces for the clamping of the workpiece. Through the use of such an adapter element, it is possible to clamp articles from the outside. It is preferably provided in this case that the clamping webs have, seen in a plan view of the adapter element, an arcuate profile.

In a further alternative construction, the clamping body may also have multiple adapter elements, in the form of blocks and/or in the form of cuboids, connected to the spring element, wherein each adapter element has at least one clamping surface for the clamping of an article. It is preferably provided in this case that each adapter element in the form of a block is connected to the spring element by a gripping-behind connection and/or an engaging, in particular surface-engaging, connection. Moreover, each adapter element in the form of a block may have a placement surface for the placement of an article to be clamped. Alternatively, the placement surface may however also be formed by a region of the clamping device disposed outside the clamping body.

Expediently, a fixing device is provided, through the use of which the clamping body is fixed on a base body of the clamping device.

In a preferred specific construction, the fixing device has a fixing element with a clamping ring, which is or can be brought into engagement with at least one wall region of the spring element and/or of the adapter element that is facing away from the base body, wherein the fixing element has multiple engaging webs, in particular cylindrical engaging webs, which protrude from the clamping ring, in particular axially, and engage in corresponding clearances of the spring element and/or of the adapter element. Preferably, the fixing element may in this case be connected to the base body by releasable screw connections.

Also, preferably, the actuating device has at least part of a drive device or an actuator for the displacement, in particular linear displacement, of the clamping element in relation to the spring element. The drive device may for example be formed by a pneumatic, hydraulic or electromechanical drive device. The electromechanical drive device may for example be formed as an electric motor. Preferably, the drive device has a path-controlled piston or a path-controlled spindle for the linear displacement of the clamping element, in particular in both linear directions.

With the objects of the invention in view, there is also provided a balancing adapter for a balancing device, including the clamping device according to the invention.

With the objects of the invention in view, there is furthermore provided a balancing device including the balancing adapter according to the invention.

The advantages obtained by the balancing adapter according to the invention and the balancing device according to the invention are identical to the already acknowledged advantages of the balancing adapter according to the invention, so that they are not repeated at this point.

Expediently, the balancing device may have a base station with a balancing adapter holder for holding the balancing adapter. Preferably, the base station has a rotary drive device for the rotary drive of the held balancing adapter and/or at least part of a drive device for the displacement, in particular linear displacement, of the clamping element in relation to the spring element.

As an alternative to a balancing adapter, the clamping device according to the invention may also be provided on a gripping device, for example on a robot gripper or robot arm. Articles can then easily and effectively be gripped or held through the use of the clamping device.

With the objects of the invention in view, there is concomitantly provided a clamping device set, including a base body, a spring element, a clamping element and multiple adapter elements, wherein the spring element, the clamping element and at least one adapter element can be connected to form a clamping body, which can be fixed on the base body by a fixing device. It is also provided that the spring element is formed as a disk and sprung in the radial direction and has a clearance, which is centrally disposed, as seen in the radial direction, and by which at least one spring element cone is formed, wherein the clamping element can be inserted into the clearance of the spring element and has at least one clamping element cone corresponding to the spring element cone, wherein each adapter element can be connected to the spring element, wherein each adapter element has at least one clamping surface for the clamping of a workpiece to be balanced, wherein at least some of the adapter elements differ at least in the configuration and/or construction of the at least one clamping surface.

Through the use of the clamping device set according to the invention, a modular construction is realized, through the use of which the clamping device can be easily adapted to different articles to be clamped.

The description given so far of advantageous constructions of the invention includes numerous features that are reproduced in the individual dependent patent claims, in some cases together. However, these features may expediently also be considered individually and combined into appropriate further combinations. In particular, these features can be respectively combined individually and in any suitable combination with the method according to the invention.

Even though some terms are used in each case in the singular or in combination with a numeral in the description and/or in the patent claims, the scope of the invention is not intended to be limited to the singular or the respective numeral for these terms. Furthermore, the words "a" or "an" are not to be understood as numerical words, but rather as indefinite articles.

The properties, features and advantages of the invention described above and the manner in which they are achieved will become clearer and more clearly understandable in conjunction with the following description of the exemplary embodiments of the invention, which are explained in greater detail in conjunction with the drawings/figures (the same components and functions have the same designations in the drawings/figures).

The exemplary embodiments are used to explain the invention and do not restrict the invention to the combinations of features, including with respect to functional features, that are specified therein. Furthermore, it is possible to this end for suitable features of each exemplary embodiment also to be considered explicitly in isolation, to be taken from one exemplary embodiment, introduced into another exemplary embodiment to supplement it and combined with any one of the claims.

BRIEF DESCRIPTION OF THE SEVERAL VIEWS OF THE DRAWING

FIG. 3 is a perspective view of a spring element of the balancing adapter;

FIG. 4 is a plan view of the spring element;

FIG. 8 is a plan view of the adapter element;

FIG. 9 is a longitudinal-sectional view of a second exemplary embodiment of a balancing adapter with a clamping device according to the invention in a view according to FIG. 2;

FIG. 10 is a perspective view of an adapter element of the balancing adapter;

FIG. 11 is a plan view of the adapter element;

FIG. 17 is a perspective view of a fifth exemplary embodiment of a balancing adapter with a clamping device according to the invention; and FIG. 18 is a longitudinal-sectional view taken along the sectional plane B-B of FIG. 17.

DETAILED DESCRIPTION OF THE INVENTION

Figure 1:
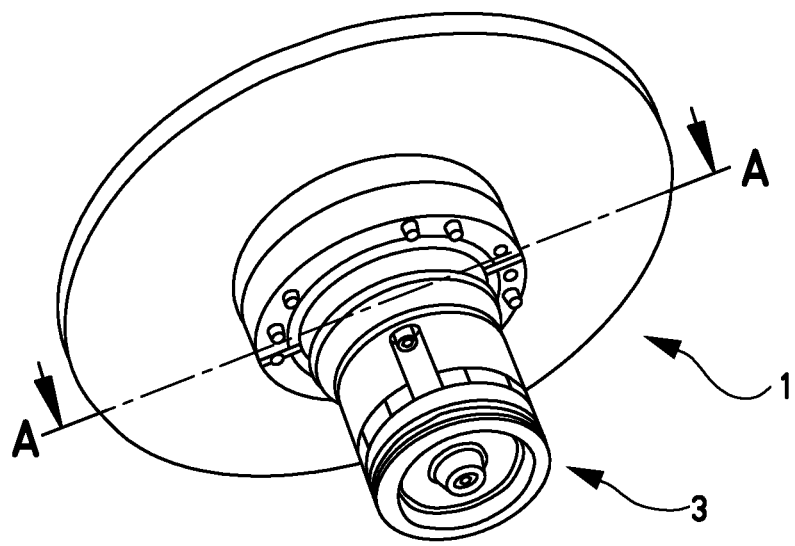
FIG. 1 is a diagrammatic, perspective view of a first exemplary embodiment of a balancing adapter with a clamping device according to the invention.

Referring now to the figures of the drawings in detail and first, particularly, to FIG. 1 thereof, there is seen a first exemplary embodiment of a balancing adapter 1 with a clamping device according to the invention. The balancing adapter 1 has a fixing region 3, with which the balancing adapter 1 can be fixed on a fixed base station 5 indicated in FIG. 2 by dashed lines. The balancing adapter 1 forms together with the base station 5 a balancing device 7, through the use of which workpieces can be balanced.

The base station 5 has a drive spindle 9, likewise indicated in this case by dashed lines, with a balancing adapter holder 11, in which the balancing adapter 1 can be disposed with its fixing region 3. The drive spindle 9 is a component part of a drive device (not shown any further herein) of the base station 5 for a rotary drive of the balancing adapter 1. Moreover, in the case of the representation shown in FIG. 2, a workpiece 13 to be balanced is clamped in the balancing adapter 1.

Figure 2:
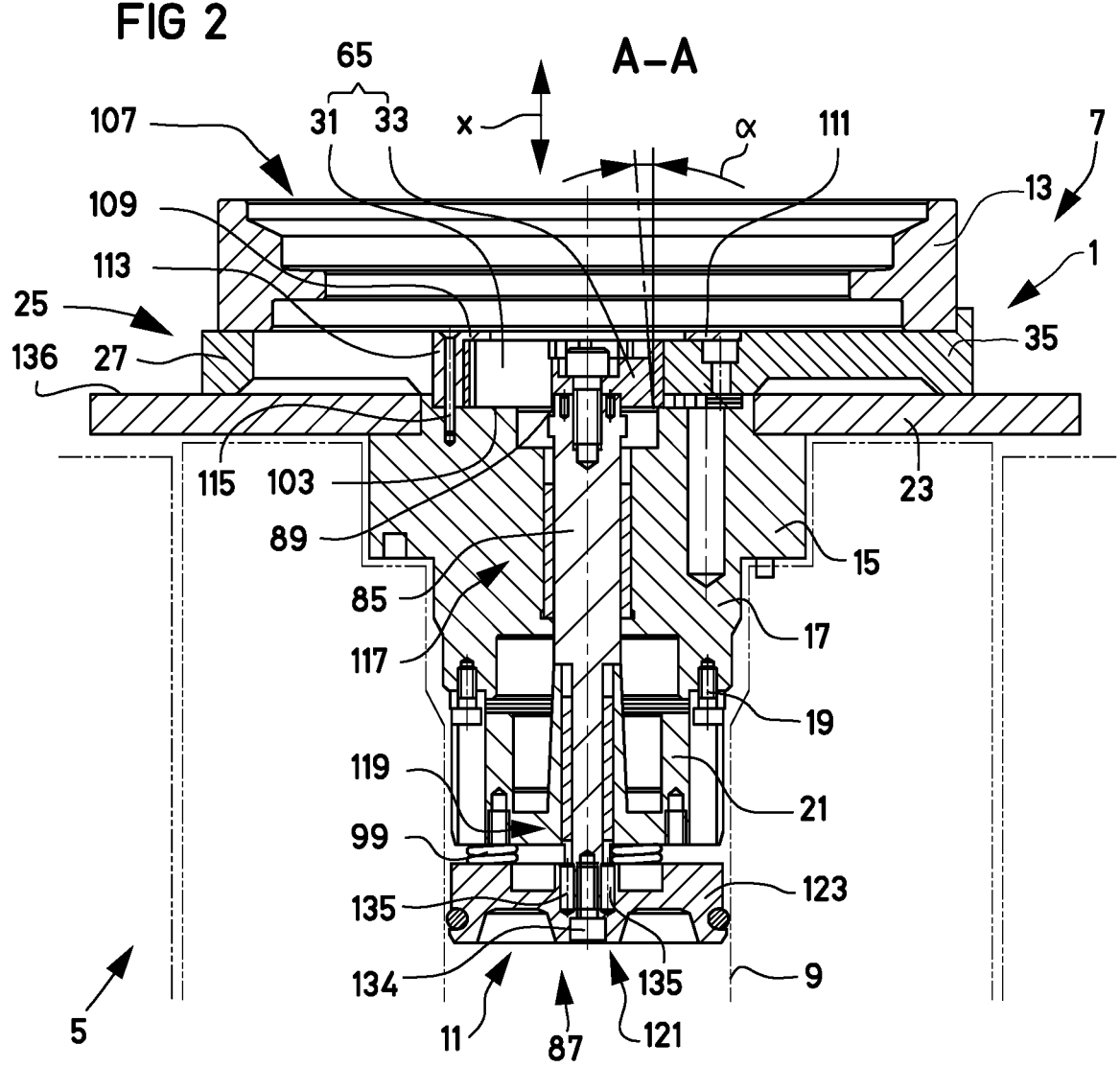
FIG. 2 is a longitudinal-sectional view taken along the sectional plane A-A of FIG. 1.

As FIG. 2 further reveals, the balancing adapter 1 has an adapter base body 15, which includes the fixing region 3. The adapter base body 15 has a substantially rotationally symmetrical first housing body 17, which is connected by way of screw connections 19 to a second, likewise substantially rotationally symmetrical housing body 21 of the adapter base body 15, which is disposed under the housing body 17 or on a side of the housing body 17 that is facing toward a placement surface of the base station 5. Moreover, the housing body 17 is connected at an upper region to a disk body 23, which protrudes outwardly from the housing body 17 and forms a flat support 136 of the adapter base body 15.

Furthermore, the balancing adapter 1 also has a clamping apparatus 25 for the clamping of a workpiece to be balanced. The clamping apparatus 25 has a clamping body 27, which is formed as a clamping disk and the clamping diameter d of which (FIG. 8) can be adjusted, in order to be able to clamp a workpiece placed on placement surfaces 29 (FIG. 8) of the clamping disk 27. The clamping disk 27 is formed in this case in three parts and has a spring element 31, a clamping element 33 and an adapter element 35.

According to FIGS. 3 and 4, the spring element 31 is formed as a disk. Moreover, the spring element 31 has multiple, in this case by way of example three, spring portions 39 disposed uniformly distributed in the circumferential direction U, through the use of which the spring element 31 can be sprung in the radial direction r. Specifically, the spring regions 39 are formed in this case by thin-walled webs 41 of the spring element 31, which, in the plan view of the spring element 31 shown in FIG. 4, have a substantially V-shaped profile. By way of the spring portions 39 or by way of the webs 41, seen in the circumferential direction U, disk portions 43 of the spring element 39 that are disposed between the webs 41 are connected to one another. As a result, the spring element 31 has defined spring properties in the radial direction r. Furthermore, the spring element 31 has at a central region, seen in the radial direction r, a clearance 37, into which the clamping element 33 can be inserted.

Figure 5:
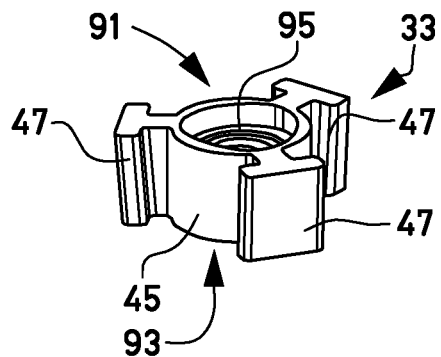
FIG. 5 is a perspective view of the clamping element.
Figure 6:
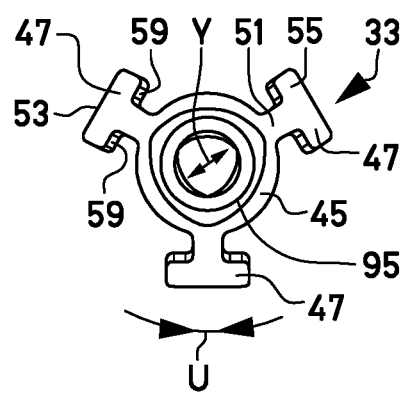
FIG. 6 is a plan view of the clamping element.

As FIGS. 5 and 6 reveal, the clamping element 33 has a central region 45, which in this case by way of example is cylindrical, and multiple, in this case by way of example three, guiding rails 47, protruding outwardly from the cylindrical region 45. In this case, each guiding rail 47 is by way of example cross-sectionally T-shaped. Through the use of these guiding rails 47, the clamping element 33 can be connected to the spring element 31. In this case, the guiding rails 47 are disposed in this case uniformly distributed around the central region 45, seen in the circumferential direction U.

According to FIGS. 5 and 6, each cross-sectionally T-shaped guiding rail 47 is connected in this case by a T base 51 or by a free end of the T base 51 to the central region 45 of the clamping element 33. The T base 51 protrudes in this case in the radial direction r from the cylindrical central region 45 of the clamping element 33. A T top 55 of the guiding rails 47 is also formed as a cuboid and at a distance from the central region 45 of the clamping element 33.

In the connected state of the clamping element 33 and the spring element 31, the guiding rails 47 engage in a contour-adapted manner in corresponding rail holders 49 of the spring element 31, with the formation of a gripping-behind engagement. In this case, the guiding rails 47 and the rail holders 49 are in this case formed in such a way that the clamping element 33 can be displaced in relation to the spring element 31 in the axial direction of the clamping disk or in the longitudinal axial direction x. Seen in the circumferential direction U, wall regions of the clamping element 33 between the guiding rails 47 are also at a distance in this case from the spring element 31.

What is more, the wall regions 53 of the T top 55 of the guiding rails 47 that are facing away from the central region 45 of the clamping element 33 form an outer cone of the clamping element 33. In this case, the wall regions 53 can be brought into surface engagement with wall regions 57 of the spring element 31 that form an inner cone. Moreover, the wall regions 59 of the T top 55 of the guiding rails 47 that are facing toward the central region 45 of the clamping element 33 form an inner cone of the clamping element 33. These wall regions 59 can be brought into surface engagement with wall regions 61 of the spring element 31 that form an outer cone. In this case, the cones of the clamping element 33 and of the spring element 31 have in this case a cone angle α (FIG. 2) between a cone surface and the longitudinal axis x which lies in a range from 1° to 20°.

Due to this construction of the guiding rails 47 and the rail holders 49, when there is a displacement of the clamping element 33 in relation to the spring element 31 in a first axial direction, the spring element 31 is pressed open or spread open in the radial direction r by the clamping element 33, so that the diameter of the spring element 31 is increased. On the other hand, when there is a displacement of the clamping element 33 in relation to the spring element 31 in an opposite second axial direction, the spring element 31 is drawn together in the radial direction r by the clamping element 33, so that the diameter of the spring element 31 is reduced.

What is more, the cone surfaces of the guiding rails 47 and of the rail holders 49 are formed in this case as planar surfaces. Alternatively, it would also be possible to form the cone surfaces of the T top as arcuately curved. Furthermore, in this case, each rail holder 49 of the spring element 31 has two wall regions 57, which are at a distance from one another, seen in the circumferential direction U, and with which the spring element 31 is in engagement with the wall region 53 of the respective guiding rail 47. Seen in the circumferential direction U, between these wall regions 57 at a distance from one another, each rail holder 49 has a depression 63 in the radially outward direction. As a result, the displacement of the clamping element 33 in relation to the spring element 33 is made easier.

The spring element 31 and the clamping element 33 form an assembly unit 65. This assembly unit 65 can be releasably connected to the adapter element 35 to form the clamping disk 27.

Figure 7:
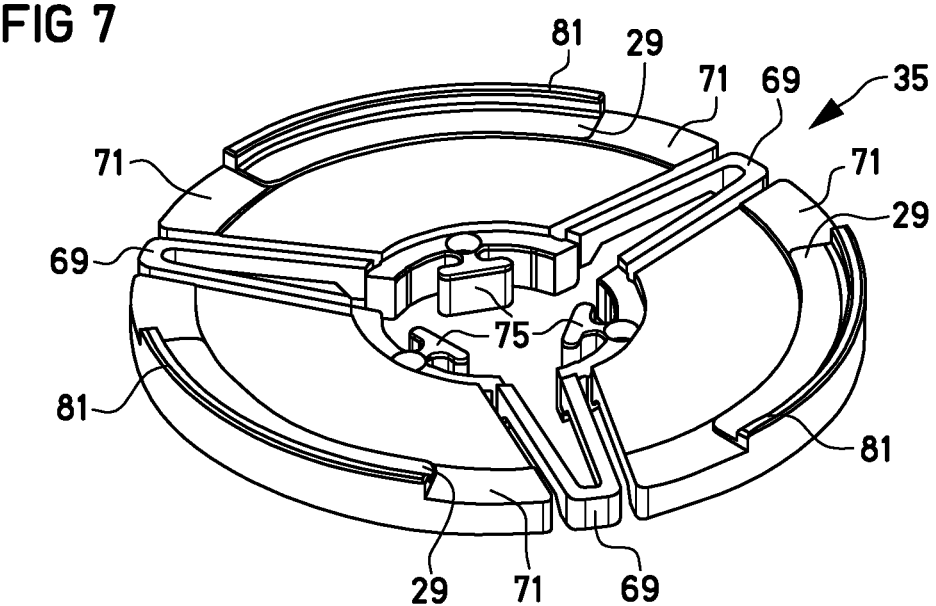
FIG. 7 is a perspective view of an adapter element of the balancing adapter.

According to FIGS. 7 and 8, the adapter element 35 is likewise formed as a disk. Moreover, the adapter element 35 has multiple spring portions 67 disposed uniformly distributed in the circumferential direction U, through the use of which the adapter element 35 can be sprung in the radial direction r. Specifically, the spring portions 67 are formed in this case by thin-walled webs 69 of the adapter element 35, which, in the plan view of the adapter element 35 shown in FIG. 8, have a substantially V-shaped profile. As seen in the circumferential direction U, disk portions 71 of the adapter element 35 that are disposed between the webs 69 are connected to one another by way of the spring portions 67 or by way of the webs 69. Consequently, as a result of the webs 69, the adapter element 35 has defined spring properties in the radial direction r.

Furthermore, the adapter element 35 also has a central clearance 73, seen in the radial direction r, into which the spring element 31 or the assembly unit 65 can be inserted. For the releasable connection of the adapter element 35 to the spring element 31, the adapter element 35 has multiple, in this case by way of example three, webs 75 engaging in the clearance 73. In this case, each engaging web 75 is by way of example cross-sectionally T-shaped. Moreover, the webs 75 are disposed uniformly distributed, seen in the circumferential direction U.

In the connected state of the adapter element 35 and the spring element 31, the webs 75 are disposed in a contour-adapted manner in corresponding web holders 77 of the spring element 31, with the formation of a gripping-behind engagement. In this case, both the webs 75 and the wall regions 79 of the adapter element 35 that are located between the webs 75, seen in the circumferential direction U, and outwardly delimit the clearance 73 can be in surface engagement in this case with the spring element 31 inserted in the clearance 73.

As FIGS. 7 and 8 also reveal, the adapter element 35 has the placement surface 29 of the balancing adapter 1 for the placement of a workpiece to be balanced. Moreover, the adapter element 35 also has multiple thin-walled clamping webs 81, which protrude from the placement surface 29 in the axial direction x and are disposed radially outside the placement surface 29. The wall regions 83 of the clamping webs 81 that are facing toward the placement surface 29, or radially inner wall regions, in this case form the clamping surfaces for the clamping of a workpiece to be balanced, and consequently also the clamping diameter d of the clamping disk 27. The clamping webs 81 have an arcuate profile in this case, seen in the plan view of the adapter element 35 shown in FIG. 8. Moreover, the clamping webs 81 are at a distance from one another in the circumferential direction, wherein each disk portion 71 is assigned a clamping web 81.

A workpiece to be balanced can be clamped from the outside through the use of the adapter element 35. For this purpose, in the assembled state of the clamping disk 27, when there is a displacement of the clamping element 33 in relation to the spring element 31 in a first axial direction, the adapter element 35 and the spring element 31 are drawn together in the radial direction r, so that the clamping diameter d is reduced. For releasing a clamped workpiece, the clamping element 33 is displaced in an opposite second axial direction in relation to the spring element 31. As a result, the spring element 31 and the adapter element 35 are pressed open in the radial direction r by the clamping element 31, so that the clamping diameter d is increased.

What is more, it is also the case in this regard that the clamping element 33 of the clamping disk 27 can be connected to an actuating element 85 (FIG. 2), in this case by way of example in the form of a rod, of an actuating device 87 of the balancing adapter 1 in a releasable manner and in a manner preventing inappropriate turning by a screw connection. For this purpose, an end region 89 of the rod-shaped actuating element 85 has an unround, in this case by way of example polygonal, cross section, with which the actuating element can be disposed in a contour-adapted manner in two identical clearances 91, 93 (FIG. 5) on the central region 45 of the clamping element 33. The clearances 91, 93 are disposed in this case on opposite sides, seen in the axial direction x of the clamping disk, of the central region 45 and are at a distance from one another in the axial direction x. As seen in the axial direction x, between the clearances 91, 93, the central region 45 also has in this case an annular shoulder 95, which protrudes radially inwardly and has an internal thread. A screw 97 may be passed through the clearances 91, 93 and the constricted region lying in between and be screwed into a threaded bore on the end face of the rod-shaped actuating element 85.

In order to connect the clamping element 33 to the actuating element 85, consequently first the actuating element 85 is inserted by the end region 89 into one of the clearances 91, 93. Subsequently, the screw 97 is passed through the opposite clearance 91, 93 and the constricted region and is screwed into the threaded bore, until it lies with its screw head against the annular shoulder 95.

Through the use of the internal thread of the annular shoulder 95, the release of the connection of the clamping element 33 and the actuating element 85 is made easier, in that a screw can be screwed in in this case, through the use of which the clamping element 33 can be pressed away from the actuating element 85.

Due to this construction of the clamping element 33 with the two clearances 91, 93, it is possible to place the assembly unit 65 in two rotary positions on the balancing adapter 1. Therefore, as shown in FIG. 2, the assembly unit 65 can be disposed in a first rotary position, in which a first main surface wall 101 (FIG. 3) of the spring element 31 is in engagement with a defined engagement wall region 103 (FIG. 2) of the adapter base body 15 of the balancing adapter 1. Moreover, the assembly unit 65 may also be disposed in a second rotary position, in which a second main surface wall 105 (FIG. 3) of the spring element 31 is in engagement with the defined engagement wall region 103. In each of these rotary positions, the assembly unit 65 can be connected or coupled to the actuating element 85 by way of the clamping element 33.

As is further shown in FIG. 2, the clamping disk 27 may also be fixed on the adapter base body 15 of the balancing adapter 1 by a fixing device 107 (FIG. 2). The fixing device 107 has a fixing element 109 with a clamping ring 111, which in the assembled state of the balancing adapter 1 is in surface engagement with the wall regions 112 (FIG. 8) of the adapter element 35 that are facing away from the adapter base body 15 or forms a narrow gap therewith. Moreover, the fixing element 109 has multiple, in this case by way of example three, cylindrical engaging webs 113 (FIG. 2), which protrude axially from the clamping ring 111 and engage in corresponding clearances 114 (FIG. 8) of the adapter element 35. Due to the engaging webs 113, the fixing element 109 is also releasably connected to the adapter base body 15. In this case, a screw 115 is passed in this case through each engaging web 113 and is screwed into a corresponding threaded bore of the first housing body 17.

As FIG. 2 further reveals, the rod-shaped actuating element 85 is guided in a linearly displaceable manner in cylindrical clearances 117, 119 of the first and second housing bodies 17, 21, with ball guides, in particular ball cages, interposed. In this case, the actuating element 85 has a first cylindrical portion, with which the actuating element is guided in the first housing body 17. Moreover, the actuating element 85 has also a second cylindrical portion with a reduced cross section, with which the actuating element is guided in the second housing body 21. Through the use of the ball guides, a centering of the linearly displaceable actuating element 85 and of the clamping disk 27 with respect to the cylindrical clearances 117, 119, and consequently the housing bodies 17, 21, is in this case realized.

Furthermore, the rod-shaped actuating element 85 is connected in this case by an end region 121 to a piston 123 of the adapter base body 15 disposed under the second housing body 21 in a manner preventing inappropriate turning. The piston 123 is part of a cylinder-piston unit of the balancing device 7 that is operated by compressed air and forms a drive device or an actuator for the linear displacement of the actuating element 85, and consequently also of the clamping element 33 of the balancing adapter 1 coupled thereto. The further components of this drive device are component parts of the base station 5 of the balancing device 7. Also disposed in this case between the piston 123 and the housing body 21 are compression springs 99, which bring about an axial preloading of the piston 123 downwardly away from the housing body 21.

Specifically, the actuating element 85 is connected in this case to the piston 123 by a screw connection, wherein a screw 134 is passed through an axially continuous clearance of the piston 123 and is screwed into a threaded bore at the end face of the actuating element 85. The end region 121 of the actuating element 85 also has in this case circumferential clearances into which cylindrical pins 135 of the piston 123 engage in a contour-adapted manner, so that inappropriate turning of the actuating element 85 in relation to the piston 123 is prevented.

Furthermore, the rod-shaped actuating element 85 can be linearly displaced by the piston 123 between a starting position and an end position. In FIG. 2, the actuating element 85 is in this case disposed in a clamping position between the starting position and the end position. In the end position, the actuating element 85 has been displaced in the upward direction in comparison with the starting position. In the assembled state of the balancing adapter 1, displacement of the actuating element 85 has the effect that the clamping element 33 of the clamping disk 27 that is coupled to the actuating element 85 is also displaced, and consequently the clamping element 33 is displaced in relation to the spring element 31.

In the case of the configuration of the assembly unit 65 shown in FIG. 2, in which the main surface wall 101 of the spring element 31 is in engagement with the adapter base body 15, the spring element 31 is pressed open radially outwardly by displacement of the actuating element 65 coupled to the clamping element 31 from the starting position into the end position upwardly under the effect of the cone surfaces. Through the use of the spring element 31, the adapter element 35 connected to the spring element 31 is also pressed open outwardly by the clamping webs 81. In this case, the spring element 31, loaded in the radial direction r, and the adapter element 35, likewise loaded in the radial direction r, relax. Consequently, when there is such a displacement of the actuating element 85, the clamping diameter d can be increased and a clamped workpiece can be released. On the other hand, by opposite displacement of the actuating element 85 downwardly from the end position into the starting position, the spring element 31 is drawn together in this case radially inwardly. Due to the spring element 31, the adapter element 35 connected to the spring element 31 is then also drawn together inwardly by the clamping webs 81. In this case, the spring element 31 and the adapter element 35 are loaded in the radial direction. As a result, when there is such a displacement of the actuating element 85, the clamping diameter d can be reduced and a workpiece can be clamped from the outside.

There follows once again a more detailed explanation of the assembly of the balancing adapter 1. First, the assembly unit 65, which is formed of the spring element 31 and the clamping element 33, is in this case connected to the rod-shaped actuating element 85 of the adapter base body 15. Subsequently, the adapter element 35, having the clamping webs 81, is connected to the assembly unit 65 to form the clamping disk 27. Finally, the clamping disk 27 is then also fastened by the fixing device 107 on the adapter base body 15 of the balancing adapter 1.

In FIGS. 9 to 11, a second embodiment of a balancing adapter 125 with a clamping device according to the invention is shown. In comparison with the embodiment shown in FIGS. 1 to 8, in this case the balancing adapter 125 does not have an adapter element 35, but an adapter element 127. In comparison with the adapter element 35, the adapter element 127 does not have any clamping webs 81. Instead, the adapter element 127 has a cylindrical clamping base 131, which protrudes from a placement surface 129 of the adapter element 127 in the axial direction x, is disposed radially inside the placement surface 129 and the wall regions 133 of which that are facing toward the placement surface 129 form the clamping surfaces for the clamping of a workpiece to be balanced. Consequently, in this case workpieces can be clamped from the inside by the adapter element 127.

Moreover, in the assembled state of the balancing adapter 125 shown in FIG. 9, the assembly unit is disposed in a rotary position turned by 180°, so that in this case the spring element 31 is in engagement by the main surface wall 105 with the engagement wall region 103 of the adapter base body 15. Consequently, the spring element 31 is drawn together radially inwardly in this case by displacement of the actuating element 85 coupled to the clamping element 33 from the starting position into the end position, shown in FIG. 9, upwardly under the effect of the cone surfaces. Due to the spring element 31, the adapter element 127 connected to the spring element 31 is also drawn together inwardly. In this case, the spring element 31, loaded in the radial direction r, and the adapter element 35, likewise loaded in the radial direction r, relax. Consequently, it is also the case in this case that when there is such a displacement of the actuating element 85, the clamping diameter d can be reduced and a clamped workpiece released.

On the other hand, by an opposite displacement of the actuating element 85 downwardly from the end position into the starting position, the spring element 31 is pressed open in this case radially outwardly under the effect of the cone surfaces. Due to the spring element 31, the adapter element 127 connected to the spring element 31 is then also pressed open outwardly by the clamping base 131. In this case, the spring element 31 and the adapter element 35 are loaded in the radial direction r. As a result, when there is such a displacement of the actuating element 85, the clamping diameter d can be increased and a workpiece clamped from the inside.

Figure 12:
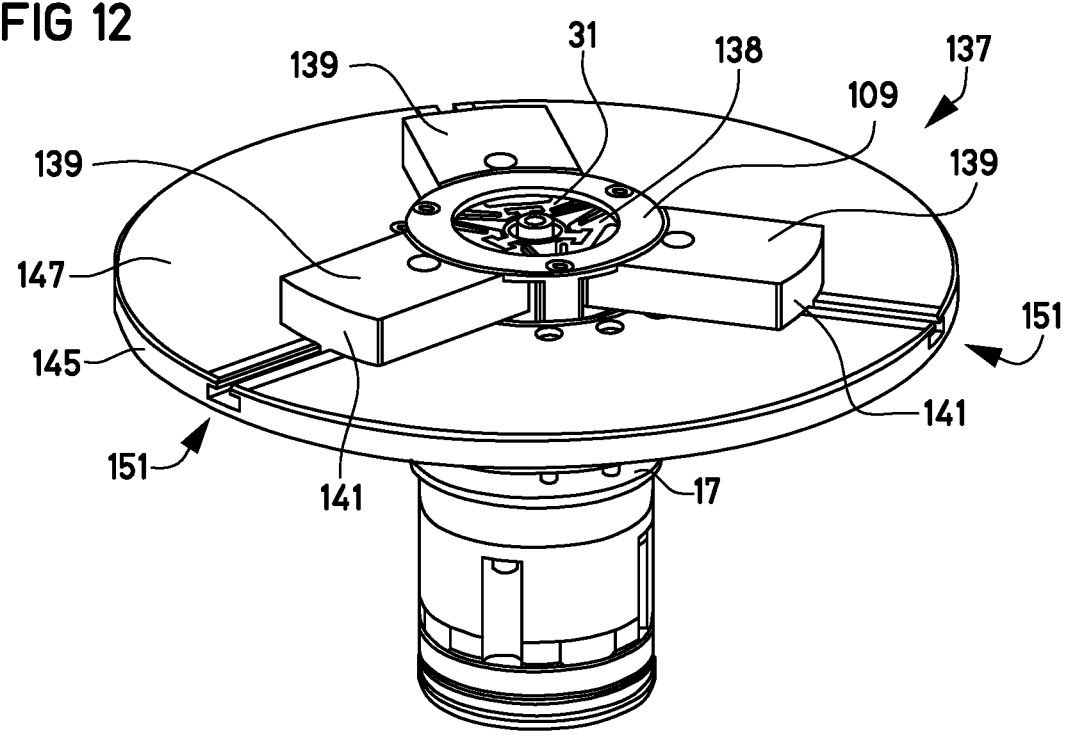
FIG. 12 is a perspective view of a third exemplary embodiment of a balancing adapter with a clamping device according to the invention.
Figure 13:
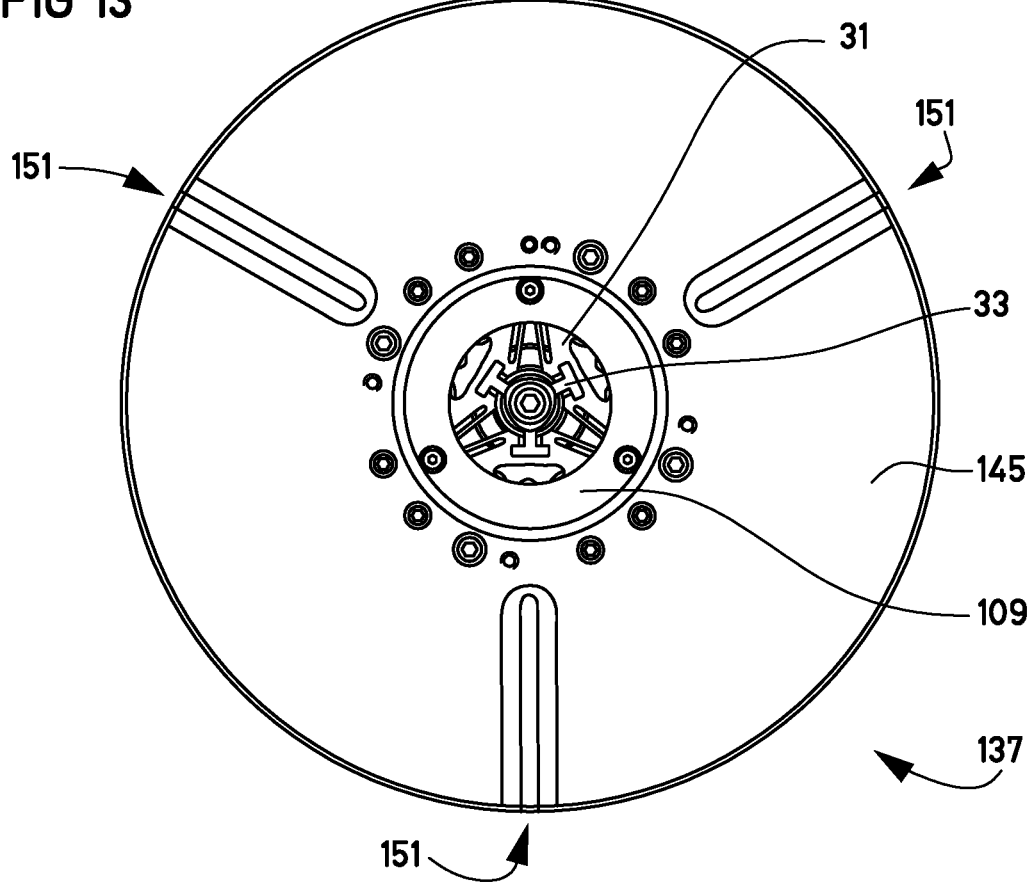
FIG. 13 is a top-plan view of part of the balancing adapter.
Figure 14:
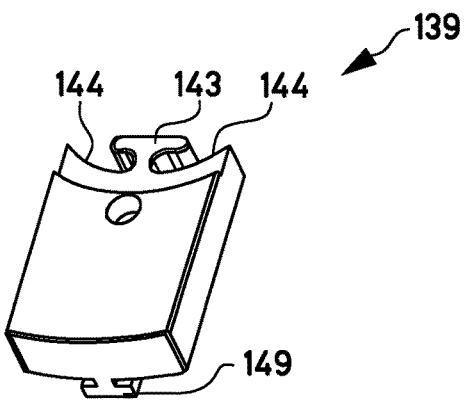
FIG. 14 is a perspective view of an adapter element of the balancing adapter.

In FIGS. 12 to 14, a third embodiment of a balancing adapter 137 with a clamping device according to the invention is shown. In comparison with the first embodiment shown in FIGS. 1 to 8, the balancing adapter 137 has a clamping body 138. The clamping body 138 does not have a disk-shaped adapter element 35, but multiple, in this case by way of example three, adapter elements 139 in the form of blocks. Each adapter element 139 is connected to the spring element 31 of the clamping body 138 and has a clamping surface 141 for the clamping of a workpiece. In this case, the adapter elements 139 are disposed uniformly distributed around the disk-shaped spring element 31.

In order to connect the respective adapter element 139 to the spring element 31, each adapter element 139 has a protruding web 143 (FIG. 14), which in this case by way of example is cross-sectionally T-shaped. In the connected state of the respective adapter element 139 and the spring element 31, the web 143 is disposed in a contour-adapted manner in one of the web holders 77 of the spring element 31, with the formation of a gripping-behind engagement. In this case, both the web 143 and the wall regions 144 of the respective adapter element 139 that are laterally adjacent the web 143 and are facing toward the spring element 31 can be in this case in surface engagement with the spring element 31. The lateral wall regions 144 are in this case formed in a contour-adapted manner in relation to corresponding outer wall regions of the spring element 31.

As FIG. 12 further reveals, the housing body 17 is connected in this case at an upper region to a disk body 145 of the balancing adapter 137, which protrudes outwardly from the housing body 17. In this case, the disk body 145 forms a placement surface 147 of the balancing adapter 137 for the placement of a workpiece to be balanced. Furthermore, the adapter elements 139 also lie on the disk body 145.

According to FIG. 14, each adapter element 139 also has a protruding guiding rail 149, which in this case by way of example is cross-sectionally T-shaped. With these guiding rails 149, the adapter elements 139 engage in a contour-adapted manner in corresponding rail holders or holding grooves 151 of the disk body 145, with the formation of a gripping-behind engagement. The guiding rails 149 and the rail holders 151 are formed in this case in such a way that the adapter elements 139 can be radially displaced in relation to the disk body 145.

Through the use of the adapter elements 139, a workpiece to be balanced can be clamped from the inside. For this purpose, in the assembled state of the clamping body 138, when there is a displacement of the clamping element 33 in relation to the spring element 31 in a first axial direction, the spring element 31 is pressed open outwardly in the radial direction r, so that the outside diameter of the spring element 31 is increased. Due to the spring element 31, the adapter elements 139 are then pressed or moved outwardly away from the central clamping element 33, wherein the clamping diameter of the clamping body 138 is increased. For releasing a clamped workpiece, the clamping element 33 is displaced in an opposite second axial direction in relation to the spring element 31. As a result, the spring element 31 is drawn together in the radial direction r by the clamping element 33, so that the outside diameter of the spring element 31 is reduced. Due to the spring element 31, the adapter elements 139 are then drawn or moved inwardly toward the central clamping element 33, wherein the clamping diameter of the clamping body 138 is reduced.

Figure 15:
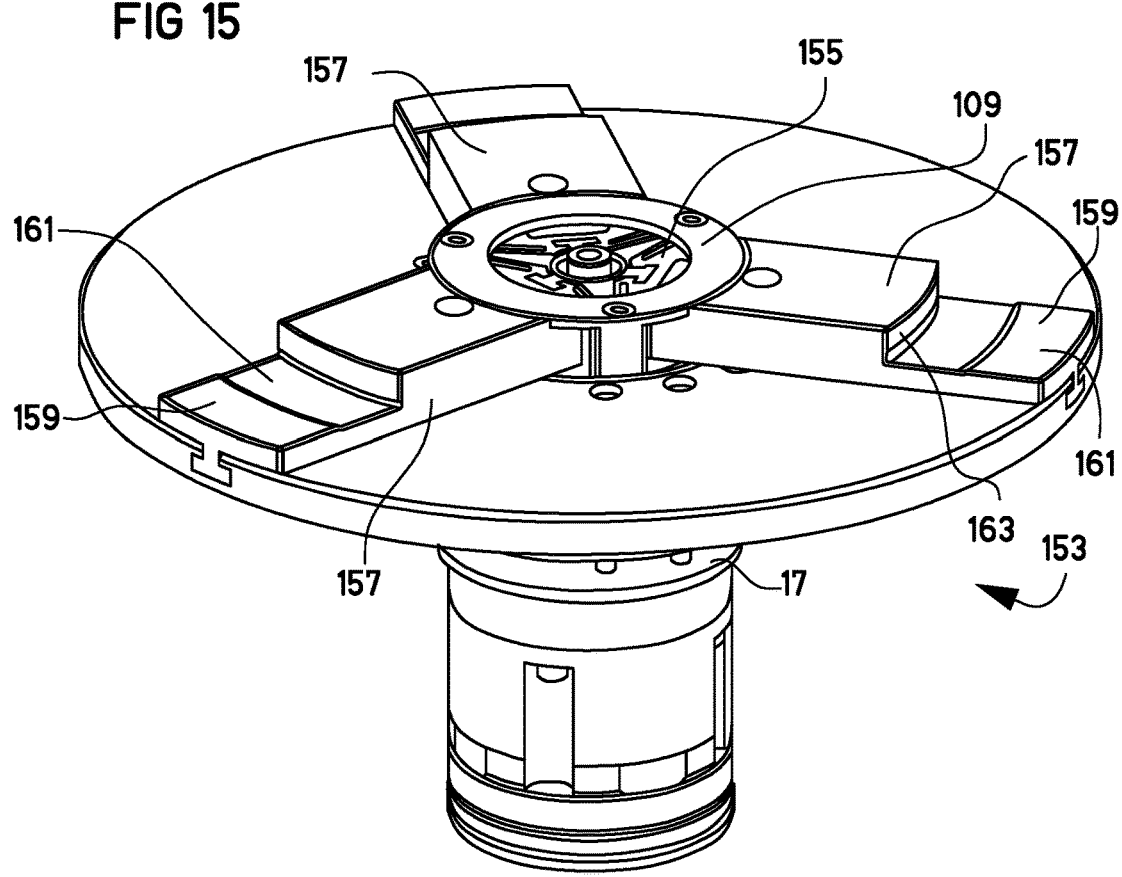
FIG. 15 is a perspective view of a fourth exemplary embodiment of a balancing adapter with a clamping device according to the invention.
Figure 16:
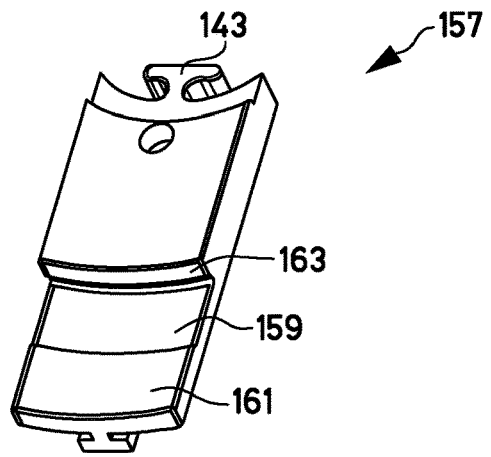
FIG. 16 is a perspective view of an adapter element of the balancing adapter.

In FIGS. 15 to 16, a fourth embodiment of a balancing adapter 153 with a clamping device according to the invention is shown. The balancing adapter 153 has a clamping body 155 with adapter elements 157. In comparison with the adapter elements 139 shown in FIGS. 12 and 14, each adapter element 157 has a placement region 159, which forms a placement surface 161 for a workpiece to be balanced. Consequently, in this case the workpieces can be placed on the placement surfaces 161 of the adapter elements 157 uniformly distributed around the spring element 31 and be clamped from the inside by the clamping body 155. A clamping surface 153 of the respective adapter element 157 is in this case formed by a step-like transition between the placement region 159 and a region of the adapter element 157 that has the connecting web 143. Alternatively, the adapter elements 157 in the form of blocks could also be formed in such a way that a workpiece can be clamped from the outside by them.

In FIGS. 17 to 18, a fifth embodiment of a balancing adapter 163 with a clamping device according to the invention is shown. The balancing adapter 163 has a rod-shaped actuating element 164, which is made shorter than the actuating element 85. Moreover, the actuating element 164 is guided in a linearly displaceable manner in a cylindrical clearance of a substantially rotationally symmetrical housing body 165 of the balancing adapter 163, with a ball guide, in particular a ball cage, interposed.

What is more, the rod-shaped actuating element 164 is connected in this case at an end region facing away from the clamping element 33 to a reciprocating piston 167 of an electric motor 169. The electric motor 169 forms a drive device or an actuator for the linear displacement of the actuating element 164, and consequently also of the clamping element 33 coupled thereto of the balancing adapter 163. In this case, the actuating element 164 can in turn be linearly displaced between a starting position and an end position by the electric motor 169.

Instead of the electric motor, other actuators, which may for example be hydraulically or pneumatically driven, may also be provided. Preferably, such actuators that allow a displacement of the clamping element 33 both in the first axial direction and in the second axial direction are provided.

List of Designations:

| | | | |
|---|---|---|---|
| 1 | Balancing adapter | 41 | Web |
| 3 | Fixing region | 43 | Disk portion |
| 5 | Base station | 45 | Central region |
| 7 | Balancing device | 47 | Web |
| 9 | Drive spindle | 49 | Disk holder |
| 11 | Balancing adapter holder | 51 | T base |
| 13 | Workpiece | 53 | Wall region |

-continued

| | | | |
|---|---|---|---|
| 15 | Adapter base body | 55 | T top |
| 17 | Housing body | 57 | Wall region |
| 19 | Screw connections | 59 | Wall region |
| 21 | Housing body | 61 | Wall region |
| 23 | Disk body | 63 | Depression |
| 25 | Clamping apparatus | 65 | Assembly unit |
| 27 | Clamping disk | 67 | Spring portion |
| 29 | Placement surface | 69 | Web |
| 31 | Spring element | 71 | Disk portion |
| 33 | Clamping element | 73 | Clearance |
| 35 | Adapter element | 75 | Web |
| 37 | Clearance | 77 | Web holder |
| 39 | Spring portion | 79 | Wall region |
| 81 | Clamping web | 119 | Clearance |
| 83 | Wall region | 121 | End region |
| 85 | Actuating element | 123 | Piston |
| 87 | Actuating device | 125 | Balancing adapter |
| 89 | End region | 127 | Adapter element |
| 91 | Clearance | 129 | Placement surface |
| 93 | Clearance | 131 | Clamping base |
| 95 | Shoulder | 133 | Wall region |
| 97 | Screw | 134 | Screw |
| 99 | Compression spring | 135 | Pin |
| 101 | Main surface wall | 136 | Flat support |
| 103 | Engagement wall region | 137 | Balancing adapter |
| 105 | Main surface wall | 138 | Clamping body |
| 107 | Fixing device | 139 | Adapter element |
| 109 | Fixing element | 141 | Clamping surface |
| 111 | Clamping ring | 143 | Web |
| 112 | Wall region | 145 | Disk body |
| 113 | Engaging web | 147 | Placement surface |
| 114 | Clearance | 149 | Guiding rail |
| 115 | Screw | 151 | Rail holder |
| 117 | Clearances | 153 | Clamping surface |
| 155 | Clamping body | | |
| 157 | Adapter element | | |
| 159 | Placement region | | |
| 161 | Placement surface | | |
| 163 | Balancing adapter | | |
| 164 | Actuating element | | |
| 165 | Housing body | | |
| 167 | Reciprocating piston | | |
| 169 | Electric motor | | |
| α | Cone angle | | |
| d | Clamping diameter | | |

The invention claimed is:

1. A clamping device for clamping an article or a workpiece to be balanced, the clamping device comprising:
a clamping apparatus for clamping the article, said clamping apparatus including a clamping body and an adjusting device for adjusting a clamping diameter of said clamping body for clamping the article;
said clamping body having a disk-shaped spring element being sprung in a radial direction and having a centrally disposed clearance forming at least one spring element cone;
said clamping body having a clamping element being inserted into said clearance of said spring element and having at least one clamping element cone corresponding to said spring element cone; and
said adjusting device having an actuating device for displacing said clamping element relative to said spring element causing cone surfaces of said clamping element cone and of said spring element cone to move relative to one another and consequently causing said spring element to be at least one of clamped or unclamped in the radial direction by said cone surfaces; and
wherein said clamping element and said spring element form an assembly unit configured to be disposed in a plurality of rotary positions, said plurality of rotary positions include a first rotary position in which a first main surface wall of said spring element is in engagement or in surface engagement with a defined engagement wall region, and said plurality of rotary positions include a second rotary position in which a second main surface wall of said spring element is in engagement or in surface engagement with said defined engagement wall region.

2. The clamping device according to claim 1, which further comprises at least one placement surface on which the article is placed for clamping, said clamping body being a clamping disk, and said actuating device displacing said clamping element relative to said spring element in an axial direction of said clamping disk.

3. The clamping device according to claim 1, wherein said assembly unit is formed as a disk.

4. The clamping device according to claim 1, wherein said actuating device has an actuating element being at least one of rod-shaped or cylinder-shaped, being displaceable between a starting position and an end position and being couplable to said clamping element of said clamping body causing said actuating element to displace said clamping element upon a displacement between said starting position and said end position.

5. The clamping device according to claim 4, wherein:
when said assembly unit is disposed in said second rotary position, said spring element is configured to be pressed open radially outwardly by displacement of said actuating element coupled to said clamping element from said end position into said starting position by said cone surfaces; and
when said assembly unit is fixed in said first rotary position, said spring element is configured to be drawn together radially inwardly by displacement of said actuating element coupled to said clamping element from said end position into said starting position by said cone surfaces.

6. The clamping device according to claim 4, wherein said rod-shaped actuating element and said clamping element are connectable to one another in at least one of a manner preventing inappropriate turning or in a releasable manner.

7. The clamping device according to claim 6, wherein said rod-shaped actuating element has an end region with at least one of an unround or a polygonal cross section with which said actuating element can be disposed in a contour-adapted manner in at least one corresponding clearance of said clamping element.

8. The clamping device according to claim 1, wherein said cone of at least one of said clamping element or said spring element has a cone angle lying in a range of from 1° to 20°.

9. The clamping device according to claim 1, wherein said clamping element and said spring element are connected to one another in a fixed or a releasable manner by at least one of a gripping-behind connection or a surface-engaging connection.

10. The clamping device according to claim 1, wherein said spring element has rail holders, said clamping element has a central region and a plurality of guiding rails protruding outwardly from said central region, and each guiding rail lies in a contour-adapted manner in a respective one of said rail holders forming a gripping-behind engagement.

11. The clamping device according to claim 10, wherein said central region is at least one of a cylindrical or a conical central region, and each guiding rail has a T-shaped cross-section.

12. The clamping device according to claim 11, wherein:
said spring element has wall regions;

each of said guiding rails has a T-shaped cross-section with a T base connected to said central region of said clamping element and a T top;

said T top has wall regions facing away from said central region of said clamping element forming an outer cone of said clamping element and being in surface engagement or configured to be brought into surface engagement with some of said wall regions of said spring element forming an inner cone; and said T top has wall regions facing toward said central region of said clamping element forming an inner cone of said clamping element and being in surface engagement or configured to brought into surface engagement with others of said wall regions of said spring element forming an outer cone.

13. The clamping device according to claim 12, wherein said guiding rails have at least one of:
at least one of a cuboid or block shape of said T tops, or
planar or arcuately curved surfaces of said cone surfaces forming said outer cone and said inner cone.

14. The clamping device according to claim 1, wherein:
said clamping body is a clamping disk;
said disk-shaped spring element has a plurality of spring portions uniformly distributed in circumferential direction, said spring portions permitting said spring element to be sprung in radial direction; and
said spring element has disk portions disposed between said spring portions and interconnected by said spring portions in circumferential direction of said clamping disk.

15. The clamping device according to claim 14, wherein said spring portions are formed by thin-walled webs of said spring element having at least one of a substantially wave-shape or meander-shape or arcuate or V-shaped profile in a plan view of said spring element.

16. The clamping device according to claim 1, wherein said clamping body has a plurality of adapter elements formed as blocks connected to said spring element, and each of said adapter elements has at least one clamping surface for clamping an article.

17. The clamping device according to claim 16, wherein each of said adapter elements is connected to said spring element by at least one of a gripping-behind connection or an engaging or surface-engaging connection.

18. A balancing adapter for a balancing device, the balancing adapter comprising a clamping device according to claim 1.

19. A balancing device, comprising:
a balancing adapter having a clamping device according to claim 1; and
a base station having a balancing adapter holder for holding said balancing adapter, said base station having a rotary drive device for a rotary drive of at least one of said held balancing adapter or at least part of a drive device for a displacement or linear displacement of said clamping element relative to said spring element.

20. A clamping device for clamping an article or a workpiece to be balanced, the clamping device comprising:
a clamping apparatus for clamping the article, said clamping apparatus including a clamping body and an adjusting device for adjusting a clamping diameter of said clamping body for clamping the article;
said clamping body having a disk-shaped spring element being sprung in a radial direction and having a centrally disposed clearance forming at least one spring element cone;

said clamping body having a clamping element being inserted into said clearance of said spring element and having at least one clamping element cone corresponding to said spring element cone; and said adjusting device having an actuating device for displacing said clamping element relative to said spring element causing cone surfaces of said clamping element cone and of said spring element cone to move relative to one another and consequently causing said spring element to be at least one of clamped or unclamped in the radial direction by said cone surfaces;

said clamping body having a disk-shaped adapter element being sprung in radial direction, and formed as a clamping disk, said adapter element having a centrally disposed clearance in which said spring element of said clamping disk is inserted, and said adapter element having at least one clamping surface for clamping the article.

21. The clamping device according to claim 20, wherein said adapter element has a placement surface for placement of the workpiece to be balanced, and said adapter element has a clamping base or a cylindrical clamping base protruding from said placement surface in axial direction of said clamping disk, being disposed inside said placement surface and having wall regions facing toward said placement surface forming clamping surfaces for clamping the article.

22. The clamping device according to claim 20, wherein said adapter element has a placement surface for placement of the workpiece to be balanced, and said adapter element has a plurality of clamping webs or thin-walled clamping webs protruding from said placement surface in axial direction of said clamping disk, being disposed outside said placement surface and having wall regions facing toward said placement surface form clamping surfaces for clamping the article.

23. A clamping device for clamping an article or a workpiece to be balanced, the clamping device comprising:
a clamping apparatus for clamping the article, said clamping apparatus including a clamping body and an adjusting device for adjusting a clamping diameter of said clamping body for clamping the article;
said clamping body having a disk-shaped spring element being sprung in a radial direction and having a centrally disposed clearance forming at least one spring element cone;
said clamping body having a clamping element being inserted into said clearance of said spring element and having at least one clamping element cone corresponding to said spring element cone; and
said adjusting device having an actuating device for displacing said clamping element relative to said spring element causing cone surfaces of said clamping element cone and of said spring element cone to move relative to one another and consequently causing said spring element to be at least one of clamped or unclamped in the radial direction by said cone surfaces; and
further comprising a base body, and a fixing device fixing said clamping body on said base body.

24. The clamping device according to claim 23, wherein said spring element has at least one wall region, said clamping body has an adapter element with at least one wall region, and said fixing device has a fixing element with a clamping ring being engaged or configured to be brought into engagement or surface engagement with said at least one wall region of at least one of said spring element or of said adapter element facing away from said base body, said fixing element having a plurality of engaging webs or cylindrical engaging webs protruding from said clamping ring and engaging in a contour-adapted manner in corresponding clearances of at least one of said spring element or said adapter element.

* * * * *